United States Patent
Bjarno (10) Patent No.: US 8,728,420 B2
(45) Date of Patent: May 20, 2014

(54) WET SCRUBBER FOR CLEANING AN EFFLUENT GAS

(71) Applicant: ALSTOM Technology Ltd, Baden (CH)

(72) Inventor: Odd Edgar Bjarno, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/968,765

(22) Filed: Aug. 16, 2013

(65) Prior Publication Data

US 2013/0336860 A1    Dec. 19, 2013

Related U.S. Application Data

(63) Continuation of application No. PCT/IB2012/000235, filed on Feb. 8, 2012.

(30) Foreign Application Priority Data

Feb. 18, 2011   (EP) .................................... 11154945

(51) Int. Cl.
*B01D 53/34* (2006.01)
*B01D 53/38* (2006.01)
*B01D 53/74* (2006.01)

(52) U.S. Cl.
USPC .................. 423/210; 423/240 R; 423/243.01; 422/168; 422/176

(58) Field of Classification Search
USPC .......... 423/210, 240 R, 243.01; 422/168, 176
See application file for complete search history.

(56) References Cited

U.S. PATENT DOCUMENTS

| | | | |
|---|---|---|---|
| 2,585,638 A | * | 2/1952 | Drew ............................. 422/173 |
| 3,360,247 A | | 12/1967 | Waldhofer |
| 3,834,129 A | | 9/1974 | Darlinger et al. |
| 3,989,485 A | | 11/1976 | Kilian |
| 4,336,035 A | | 6/1982 | Evenstad et al. |
| 4,502,872 A | | 3/1985 | Ivester et al. |
| 5,536,454 A | | 7/1996 | Fujii et al. |
| 5,595,713 A | | 1/1997 | Gohara et al. |
| 5,885,539 A | | 3/1999 | Bjarno et al. |
| 6,138,378 A | | 10/2000 | Takashina et al. |
| 2008/0044335 A1 | | 2/2008 | Anttila et al. |
| 2008/0199379 A1 | | 8/2008 | Bogenstatter et al. |
| 2009/0159434 A1 | | 6/2009 | Girault et al. |
| 2010/0266472 A1 | | 10/2010 | Peng |

FOREIGN PATENT DOCUMENTS

| | | |
|---|---|---|
| DE | 43 31 415 | 3/1995 |
| EP | 1 601 441 | 8/2007 |
| WO | 97/09111 | 3/1997 |

* cited by examiner

*Primary Examiner* — Timothy Vanoy
(74) *Attorney, Agent, or Firm* — Buchanan Ingersoll & Rooney PC (57) ABSTRACT

A wet scrubber for removal of at least one gaseous pollutant from an effluent gas includes an inlet opening. A gas distributor is arranged in a wet scrubber housing and comprises a diffuser having a cover plate. The cover plate is arranged in the path of the effluent gas flowing into the wet scrubber housing. The diffuser has at least one diffuser channel for transporting the effluent gas from the inlet opening into the wet scrubber housing.

18 Claims, 8 Drawing Sheets

WET SCRUBBER FOR CLEANING AN EFFLUENT GAS

CROSS-REFERENCE TO RELATED APPLICATIONS

This application claims priority from PCT/IB2012/000235 filed Feb. 8, 2012, which in turn claims priority from European Application 11154945.7 filed Feb. 18, 2011, both of which are hereby incorporated in their entirety.

TECHNICAL FIELD

The present invention relates to a wet scrubber for removal of at least one gaseous pollutant from an effluent gas. The wet scrubber comprises an inlet opening, a wet scrubber housing fluidly connected to the inlet opening and through which housing the effluent gas is to flow in a scrubber gas flow direction, and an absorption liquid supply device for a supply of absorption liquid to said wet scrubber housing for contact with an effluent gas within the wet scrubber housing.

The present invention further relates to a method of removing at least one gaseous pollutant from an effluent gas through contact with an absorption liquid inside a wet scrubber housing.

BACKGROUND

In many industrial processes a process gas containing pollutants is generated. One such industrial process is the combustion of a fuel, such as coal, oil, peat, waste, etc. In a combustion plant such as a power plant, a hot process gas is generated, often referred to as a flue gas, containing pollutants including acid gases such as sulphur dioxide, $SO_2$. It is necessary to remove as much of the acid gases from the flue gas as possible before releasing the flue gas to the ambient air.

Another example of an industrial process in which a process gas containing pollutants is generated is the electrolytic production of aluminium from alumina. Aluminium may be produced by electrolytic reactions in aluminium production electrolytic cells, sometimes called electrolytic smelting pots, using the Hall-Héroult process. An example of an electrolytic smelting pot is disclosed in US 2009/0159434. The electrolytic reaction occurring in the electrolytic smelting pots produces effluent gas in the form of hot, particle-laden effluent gas, which needs to be cleaned in a gas cleaning unit before being discharged to the atmosphere.

US 2010/0266472 discloses a wet scrubber in which effluent gas enters a wet scrubber housing via an inlet opening arranged in the bottom of the housing. The effluent gas is brought into contact with an absorption liquid inside the wet scrubber housing. The absorption liquid absorbs acid gases, such as sulphur dioxide, from the effluent gas.

SUMMARY

An object of the present invention is to provide a wet scrubber for removing gaseous pollutants from an effluent gas in a manner more efficient than that of the prior art.

The above-noted object is achieved by a wet scrubber of the above referenced type and further comprising a gas distributor arranged within the wet scrubber housing. The gas distributor comprises a diffuser having a cover plate arranged in the path of the effluent gas flowing into the wet scrubber housing via the inlet opening. The diffuser is further equipped with at least one diffuser channel for channeling the effluent gas from the inlet opening into the wet scrubber housing.

An advantage of the above-described wet scrubber is that very little energy is required to force the flow of effluent gas through the wet scrubber housing. The diffuser recovers most of the dynamic energy in the effluent gas from a gas transporting device, such as a fan, when the gas enters the wet scrubber housing via the diffuser.

According to one embodiment, the at least one diffuser channel is at an angle of 70-110° with respect to the wet scrubber housing. An advantage of this embodiment is that the effluent gas flow turns substantially upon entering the wet scrubber housing. Such contributes to an even distribution of the effluent gas inside the wet scrubber housing, supporting efficient removal of pollutants from the effluent gas.

According to one embodiment a scrubber inlet duct is arranged for directing effluent gas into the wet scrubber housing via the inlet opening in an inlet gas flow direction which is within +/−45° of the scrubber gas flow direction in which the effluent gas flows when being contacted with the absorption liquid. An advantage of this embodiment is that the wet scrubber may be designed in a compact manner. According to a further embodiment a scrubber inlet duct is arranged for directing effluent gas into the wet scrubber housing via the inlet opening in an inlet gas flow direction which is within +/−30° of the scrubber gas flow direction.

According to one embodiment, the diffuser is provided with at least three diffuser channels separated by side walls. An advantage of this embodiment is that the effluent gas is more evenly distributed in the wet scrubber housing. Furthermore, the diffuser is more robust in the case of an uneven effluent gas distribution upon entering the wet scrubber housing via the inlet opening. According to one embodiment, the diffuser comprises 4-20 diffuser channels arranged side by side.

According to one embodiment, the absorption liquid supply device is arranged in an upper portion of the wet scrubber housing, and the inlet opening is arranged in a lower portion of the wet scrubber housing, with the scrubber gas flow directed vertically upward. An advantage of this embodiment is that the absorption liquid flows vertically downward, supported by the action of gravity, in a counter-current relation to that of the effluent gas resulting in an efficient removal of pollutants. Furthermore, the effluent gas flows upward, which normally coincides with a desired flow direction for a fluidly connected stack for cleaned effluent gas release to the atmosphere.

According to one embodiment, the inlet opening is connected to a fan forcing a flow of effluent gas through the wet scrubber housing. An advantage of this embodiment is that a very compact arrangement, with shortened ductwork lengths, is achieved.

According to one embodiment, the gas distributor comprises an inlet throat fluidly connected to the inlet opening. The inlet throat comprises an inner curvature over which the effluent gas flows when moving from the inlet opening to the diffuser. An advantage of this embodiment is that the effluent gas flow turns from the inlet opening into the diffuser in a very efficient manner with relatively little loss of dynamic energy.

According to one embodiment, the gas distributor comprises a liquid collector having a trough arranged over the diffuser to collect absorption liquid supplied by the absorption liquid supply device. An advantage of this embodiment is that the absorption liquid may be drained without altering the function of the diffuser.

According to one embodiment, the liquid collector comprises at least one drain pipe for draining absorption liquid collected in the trough past the diffuser. An advantage of this embodiment is that the absorption liquid may be drained from the liquid collector in a manner which allows the diffuser to operate with minimal interference from the absorption liquid.

According to one embodiment, the gas distributor is located centrally in a bottom of the wet scrubber housing. An advantage of this embodiment is that a desirable distribution of effluent gas inside the wet scrubber housing may be achieved.

According to one embodiment, a cross-sectional area at the inlet of the diffuser is smaller than a cross-sectional area at the inlet opening, such that a throttling of the effluent gas flow is effected when the effluent gas passes from the inlet opening toward the diffuser. An advantage of this embodiment is that a throttling of the effluent gas flow at the inlet of the diffuser causes a trimming of the gas distribution as described in more detail below. According to one embodiment, the cross-sectional area at the inlet of the diffuser is 70-99% of the cross-sectional area at the inlet opening.

A further object of the present invention is to provide a method of removing gaseous pollutants from an effluent gas in a manner more efficient than that of the prior art.

This object is achieved through a method of removing at least one gaseous pollutant from an effluent gas by bringing the effluent gas into contact with an absorption liquid inside a wet scrubber housing. The method comprises admitting the effluent gas into the wet scrubber housing via an inlet opening, passing the effluent gas to a diffuser having a cover plate in the path of the effluent gas flowing into the wet scrubber housing via the inlet opening, channeling the effluent gas through at least one diffuser channel and into the wet scrubber housing, and forwarding the effluent gas in a scrubber gas flow direction in which the effluent gas flows through the wet scrubber housing when being brought into contact with the absorption liquid.

An advantage of this method is that cleaning of the effluent gas may be achieved with minimal energy consumption in a compact wet scrubber housing.

According to one embodiment, the method comprises forwarding the effluent gas in the scrubber gas flow direction being directed substantially vertically upward through the wet scrubber housing, and forwarding the effluent gas through the at least one diffuser channel at an angle of about 70-110° to the scrubber gas flow direction. An advantage of this embodiment is that the effluent gas is distributed in the wet scrubber housing very efficiently with regard to both space and energy consumption.

According to one embodiment an inlet gas flow direction of the effluent gas in the inlet opening is within +/−45° of the scrubber gas flow direction. According to a further embodiment the inlet gas flow direction of the effluent gas in the inlet opening is within +/−30° of the scrubber gas flow direction.

According to one embodiment, the method further comprises collecting absorption liquid in a liquid collector equipped with a trough positioned over the diffuser. According to a preferred embodiment, the method further comprises draining absorption liquid collected in the trough past the diffuser separate and apart from the flow of effluent gas. An advantage of this embodiment is that disturbance to the operation of the diffuser is minimized.

According to one embodiment, the gas velocity of the effluent gas is reduced by a factor of 1.5-3.0 while passing through the diffuser.

Further objects and features of the present invention will be apparent from the following detailed description and claims.

BRIEF DESCRIPTION OF THE DRAWINGS

The invention is described in more detail below with reference to the appended drawings in which.

DETAILED DESCRIPTION

Figure 1:
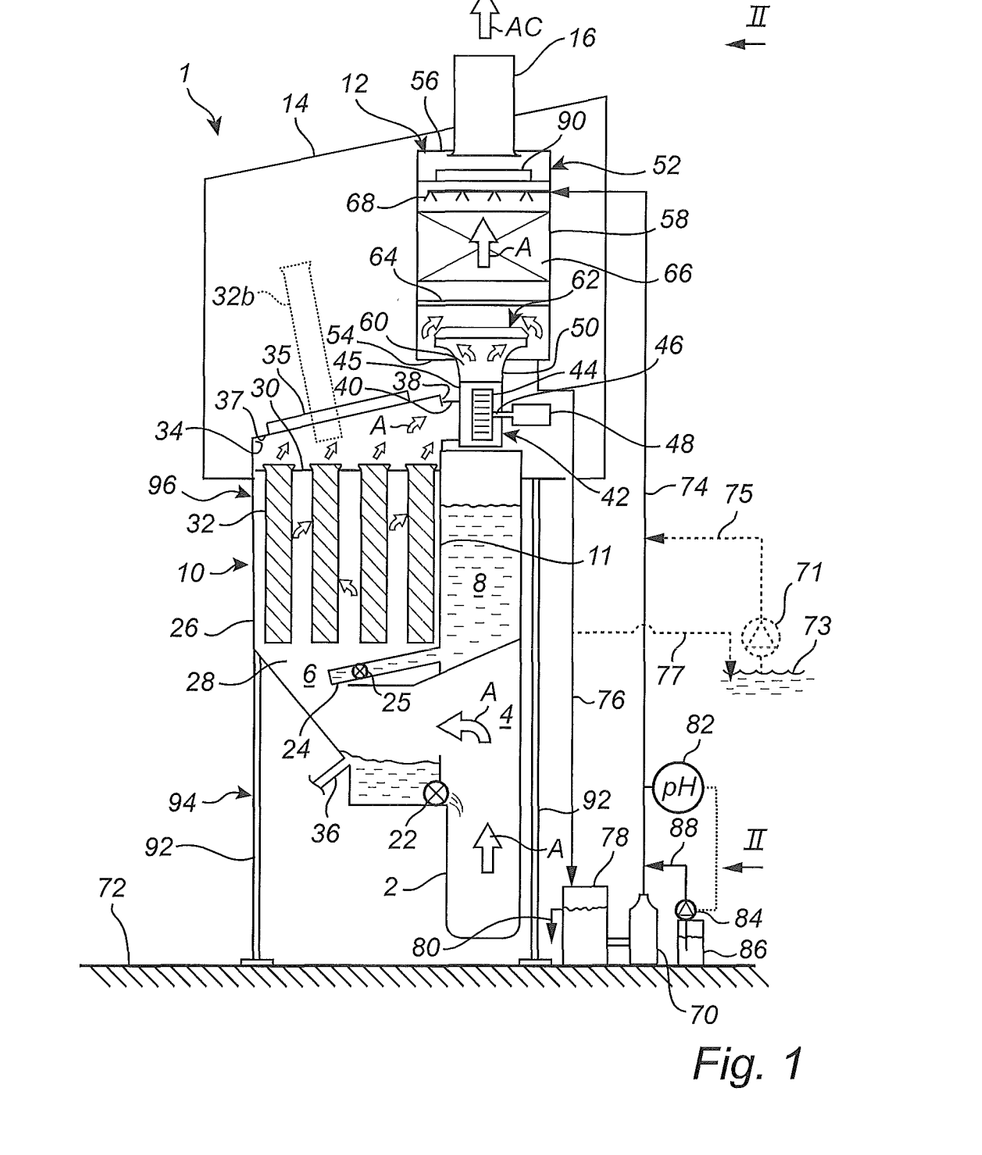
FIG. 1 is a schematic side view, in cross-section, of a gas cleaning unit cleaning effluent gas from at least one aluminium production electrolytic cell.

FIG. 1 is a schematic representation of a gas cleaning unit 1 in cross-section viewed from the side thereof. The gas cleaning unit 1 comprises, as its main components, a gas inlet duct 2, a first contact reactor 4, a second contact reactor 6, an alumina silo 8, a dust removal device 10, a wet scrubber 12, a gas cleaning unit penthouse 14, and a stack 16. Arrows A indicate the intended flow path of the effluent gas through the gas cleaning unit 1.

Figure 2:
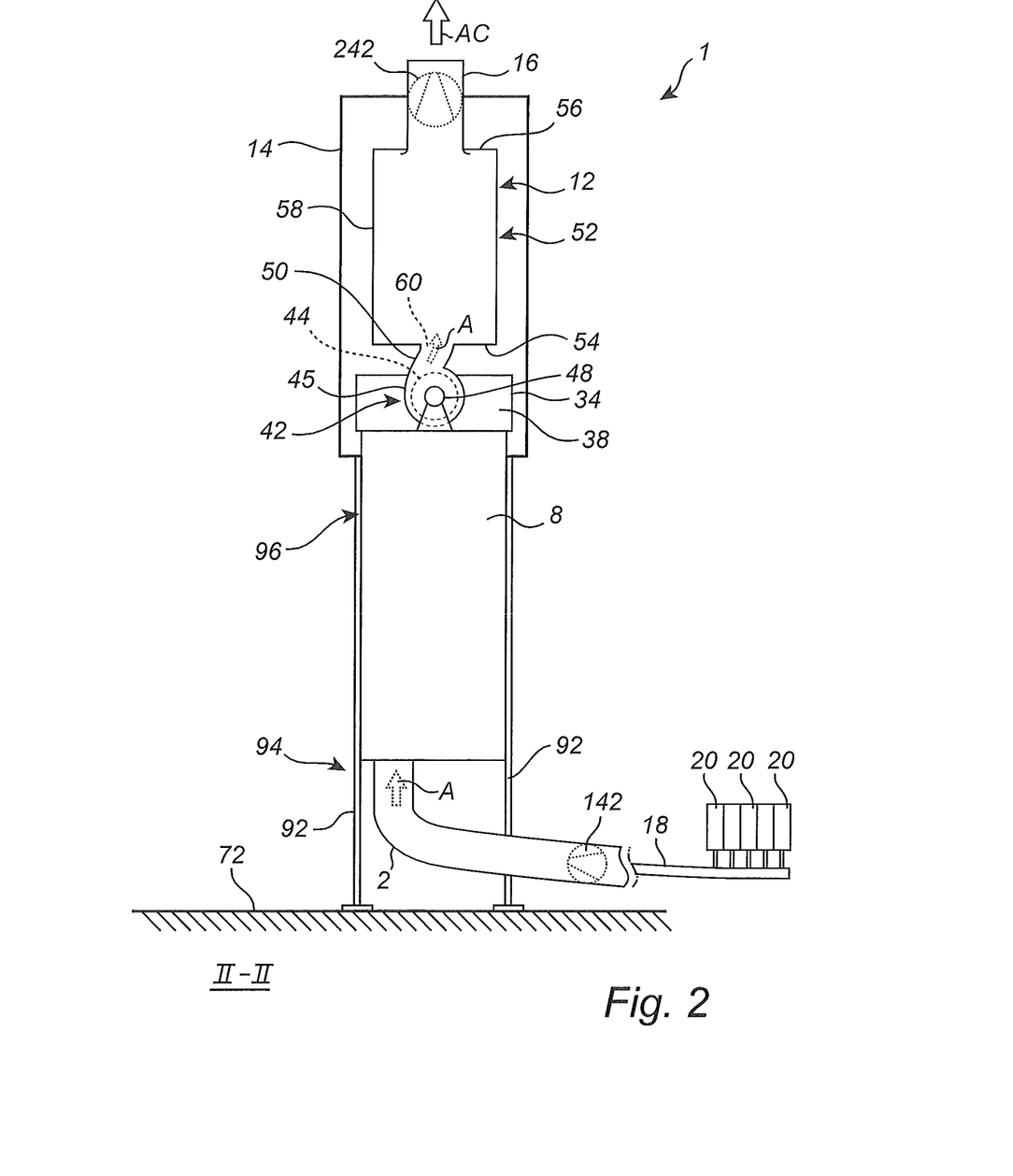
FIG. 2 is a schematic side view of a gas cleaning unit, viewed in the direction depicted by arrows II-II of FIG. 1.

FIG. 2 illustrates the gas cleaning unit 1 viewed in the direction of arrows II-II of FIG. 1, i.e., as viewed from the side of FIG. 1. The gas inlet duct 2 is connected to a collecting duct 18, illustrated schematically and not drawn to scale, collecting effluent gas from each of, typically, 1 to 400, more typically 5 to 200, aluminium production electrolytic cells 20, each of which may be operative for producing aluminium in accordance with, for example, the above mentioned Hall-Héroult process.

Returning to FIG. 1, the gas inlet duct 2 channels the effluent gas flow from the aluminium production electrolytic cells to the first contact reactor 4. A volumetric feeder 22 is operative for recirculating alumina, $Al_2O_3$, in the first contact reactor 4 to provide for efficient contact between the alumina and the effluent gas. As an effect of such contact, gaseous pollutants, such as hydrogen fluoride, HF, and sulphur dioxide, $SO_2$, are adsorbed by the alumina.

The effluent gas flows further to the second contact reactor 6. A supply pipe 24 with a volumetric feeder 25 is arranged for supplying fresh alumina to the second contact reactor 6 from the fluidly connected alumina silo 8. The fresh alumina effects a further adsorption of pollutants from the effluent gas on alumina. The alumina silo 8 is arranged beside the dust removal device 10, and share a common vertical side wall 11. The wet scrubber 12 is arranged above the alumina silo 8 and at least partly obscures the view of alumina silo 8 when looking vertically downward from the top of the wet scrubber 12, as is clear from the combined perspectives of FIG. 1 and FIG. 2.

The effluent gas, comprising particles entrained from the aluminium production electrolytic cells 20, recycled alumina entrained from the first contact reactor 4, and fresh alumina entrained from the second contact reactor 6, flows to the dust removal device 10. The dust removal device 10 is arranged above the second contact reactor 6. The dust removal device 10 may, for example, be an electrostatic precipitator, the basic principle of which is known from, for example, U.S. Pat. No.

4,502,872, or a fabric filter, the basic principle of which is known from, for example, U.S. Pat. No. 4,336,035.

The dust removal device illustrated in FIG. 1 is a fabric filter 10. The fabric filter 10 comprises a housing 26. The effluent gas enters the housing 26 via an open lower end 28 thereof. A horizontal plate 30 is arranged in an upper end of the housing 26. Extending from plate 30 are a number of fabric filtering devices in the form of fabric bags 32, each such fabric bag 32 extending through a corresponding opening in the plate 30. Typically, a fabric filter 10 may comprise 2 to 40 000 such fabric bags 32. In operation, effluent gas, loaded with dust particles, including alumina, enters the open lower end 28 of the housing 26. The effluent gas passes through the fabric of the bags 32 and into the interior of the bags 32, while the dust particles are collected on the outside of the bags 32. Then, effluent gas, from which at least a portion of the dust particles have been separated, flows via the interior of the bags 32, upward through the plate 30, and enters a clean gas plenum 34 of the fabric filter 10. Occasionally, the collected dust particles are removed from the bags 32, for example by pulsing the bags 32 with pressurized air, in accordance with the principles disclosed in U.S. Pat. No. 4,336,035, or by shaking the bags 32. The dust particles thereby removed from the bags 32 are partly returned to the contact reactors 4, 6, and partly removed from the gas cleaning unit 1 via an outlet 36. The removed particles would normally be directly transported to the aluminium production electrolytic cells 20 illustrated in FIG. 2.

Continuing with the description of FIG. 1, the clean gas plenum 34, which is arranged at the top of the fabric filter 10, above the plate 30 and the bags 32, is provided, in a vertical side wall 38 thereof, with a horisontal outlet duct 40. The outlet duct 40 is fluidly connected to a fan 42, which in the example of FIG. 1 is a radial fan 42. The radial fan 42 is provided with an impeller 44 arranged within a housing 45 of the fan 42 and rotated by a horizontal shaft 46 driven by a motor 48. The effluent gas, flowing horizontally through the outlet duct 40, enters the radial fan 42 in the axial direction of the impeller 44 and is given an impulse in a vertical direction, radially of the impeller 44. The effluent gas is forwarded upwardly by fan 42 and leaves fan 42 substantially vertically via fan outlet 50.

FIG. 2 illustrates, schematically, two alternative locations of a fan. In accordance with a first alternative embodiment, a fan 142 may be arranged in the gas inlet duct 2. In accordance with a second alternative embodiment, a fan 242 may be arranged just after the wet scrubber 12. Fans 142, 242 could be utilized as alternatives to, or in combination with, fan 42 for generating a flow of effluent gas through the gas cleaning unit 1.

The wet scrubber 12 comprises a housing 52. The housing 52 comprises a horizontal bottom 54, a horizontal roof 56, and a generally cylindrical side wall 58 extending between the bottom 54 and the roof 56. The housing 52 of the wet scrubber 12 is entirely located inside the penthouse 14 of the gas cleaning unit 1. This means that the housing 52 of the wet scrubber 12 is protected from wind loads, UV-radiation, precipitation, sand storms, etc, which substantially reduces the material and load requirements on the wet scrubber 12 housing 52.

The wet scrubber 12 housing 52 is arranged at a point above or vertically higher than and just beside the fabric filter 10, as is best illustrated in FIG. 1. Upon exchanging worn or damaged filter bags 32, the filter bags 32 may be removed through vertically upward movement thereof through hatches 35 arranged in the roof 37 of the clean gas plenum 34. A filter bag 32b, illustrated with dotted lines, indicates the position of the filter bag 32b during the removal/exchange thereof. By arranging the wet scrubber 12 housing 52 beside the fabric filter 10 clean gas plenum 34 the exchange of filter bags 32 is not obstructed by the housing 52. As can be seen from FIGS. 1 and 2, the wet scrubber 12 housing 52 is arranged just above the alumina silo 8.

The wet scrubber 12 bottom 54 is provided with an inlet opening 60 which is fluidly connected to the fan outlet 50. The inlet opening 60 is fluidly connected to a gas distributor 62, which distributes the gas coming from the fan 42 inside the housing 52 of the wet scrubber 12. An optional horizontal gas distribution grid 64 may be arranged above the gas distributor 62 inside the housing 52 to support the formation of an even gas distribution profile of the effluent gas inside the housing 52. Optionally, a gas-liquid contacting packing 66 may be arranged inside the housing 52, above the gas distributor 62 and gas distribution grid 64, to improve contact between effluent gas and an absorption liquid supplied via nozzles 68 arranged inside the housing 52, above the distributor 62, grid 64, and packing 66. Examples of such gas-liquid packing 66 include Mellapak™ available from Sulzer Chemtech AG, Winterthur, CH, and Pall™ rings available from Raschig GmbH, Ludwigshafen, DE. In accordance with one embodiment, the gas-liquid packing 66 may be a wooden packing made from a grid of wooden rods. A wooden packing makes it possible to operate the wet scrubber 12 without supply of absorption liquid for shorter periods of time, without causing damage to the packing material.

The absorption liquid would typically comprise water along with an alkali substance. The alkali substance may for example be sodium hydroxide, NaOH, sodium carbonate, $Na_2CO_3$, calcium hydroxide, CaOH, limestone, $CaCO_3$, or any other substance that is suitable for neutralising the acid pollutants of the effluent gas, including for example sulphur dioxide, $SO_2$, and hydrogen fluoride, HF, that are to be removed from the effluent gas by the wet scrubber 12. In accordance with a further embodiment, the absorption liquid comprising water along with an alkali substance could, at least in part, be supplied to the wet scrubber 12 in the form of seawater, for example in the form of seawater from a nearby ocean. When operating the scrubber with seawater, the seawater would be passed through the wet scrubber 12 to absorb and neutralize sulphur dioxide and hydrogen fluoride from the effluent gas, after which the seawater would be returned to the ocean.

For example, the absorption and neutralisation of sulphur dioxide and hydrogen fluoride from the effluent gas using sodium hydroxide, NaOH, could occur in accordance with the following reactions:

$$SO_2(g)+2NaOH(aq)+\tfrac{1}{2}O_2(g) => Na_2SO_4(aq)+H_2O \quad [\text{eq. 1.1}]$$

$$HF(g)+NaOH(aq) => NaF(aq)+H_2O \quad [\text{eq. 1.2}]$$

A pump 70 is arranged on the ground 72 and is arranged for pumping absorption liquid via fluidly connected supply pipe 74 to the fluidly connected nozzles 68. The nozzles 68 atomize the absorption liquid and brings it into contact, optionally with the aid of the gas-liquid contacting packing 66, with the effluent gas flowing vertically upward inside the housing 52 of the wet scrubber 12. The spent absorption liquid is collected on the bottom 54 of the housing 52 and flows, via a fluidly connected pipe 76, to a circulation tank 78. The circulation tank 78 is fluidly connected to the pump 70 which returns the absorption liquid to the nozzles 68. An overflow pipe 80 is connected to the tank 78 for removing excess absorption liquid.

A pH measurement device 82 is connected to the pipe 74 for measuring the pH of the absorption liquid. The pH measurement device 82 controls a pump 84 which pumps an alkali solution, such as an NaOH solution, from a storage tank 86 to the pipe 74 via fluidly connected supply pipe 88. The pH measurement device 82 controls the pump 84 to keep the pH value in the absorption liquid supplied to the nozzles 68 via fluidly connected pipe 74 at a predetermined value, for example at pH 6.5.

In accordance with an alternative embodiment, a pump 71 is arranged for pumping seawater, having a pH of, for example, around 7.5 to 8.5, from a nearby ocean 73 to the supply pipe 74 via fluidly connected pipe 75. The seawater is utilized as an absorption liquid in the wet scrubber 12 to absorb and neutralize sulphur dioxide and hydrogen fluoride in accordance with reactions that are similar to those described hereinbefore with regard to NaOH. After such absorption and neutralisation, the seawater is returned to the ocean 73 via pipe 76 and fluidly connected pipe 77. Optionally, some fresh water, or some recirculated seawater, may be circulated in the wet scrubber 12, together with the supply of fresh seawater from the ocean 73.

A droplet eliminator 90 is arranged vertically above the nozzles 68. The droplet eliminator 90 removes any droplets contained in the effluent gas before allowing the effluent gas to enter the stack 16. The cleaned effluent gas, illustrated by means of an arrow AC, leaves the stack 16 and is discharged into the atmosphere.

The gas cleaning unit 1 is supported on stands 92 forming together a common support structure 94. The contact reactors 4, 6, the fabric filter 10, and the wet scrubber 12, except ancillary equipment such as pump 70 and tank 78, together form a common stacked unit 96 which is supported by the common support structure 94 being common to the contact reactors 4, 6, the fabric filter 10, and the wet scrubber 12. In the embodiment of FIGS. 1 and 2 the alumina silo 8, the penthouse 14, and the stack 16 also form part of the stacked unit 96, and are supported by the common support structure 94. As is clear from a reference to FIGS. 1 and 2 the entire gas cleaning unit 1 has a very small footprint with the wet scrubber 12 being arranged on a higher vertical level than the fabric filter 10, and above the alumina silo 8. Furthermore, the outlet duct 40 forwarding the effluent gas from the fabric filter 10 to the wet scrubber 12 is very short, typically only 0.1 to 2 m. Still further, the stack 16 is also very short, since it is arranged directly on top of the housing 52 of the wet scrubber 12, which is already located on a considerable height above the ground 72.

A method of cleaning effluent gas in the gas cleaning unit 1 involves introducing the effluent gas via the gas inlet duct 2. The effluent gas is brought into contact with recycled alumina particles in the first contact reactor 4 causing adsorption of hydrogen fluoride and sulphur dioxide on the alumina particles. A further adsorption occurs in the second contact reactor 6. The effluent gas is then filtered in the fabric filter 10. Such filtering causes a removal of entrained dust particles and alumina laden with hydrogen fluoride and sulphur dioxide. The filtered effluent gas is then forwarded from the clean gas plenum 34 of the fabric filter 10 and is almost immediately introduced in the wet scrubber 12 via the inlet opening 60 thereof. Inside the housing 52 of the wet scrubber 12 the effluent gas is brought into contact with an absorption liquid causing a further removal of sulphur dioxide and hydrogen fluoride. The cleaned effluent gas is discharged to the atmosphere via a stack 16 arranged immediately on top of the wet scrubber 12 housing 52.

Figure 3:
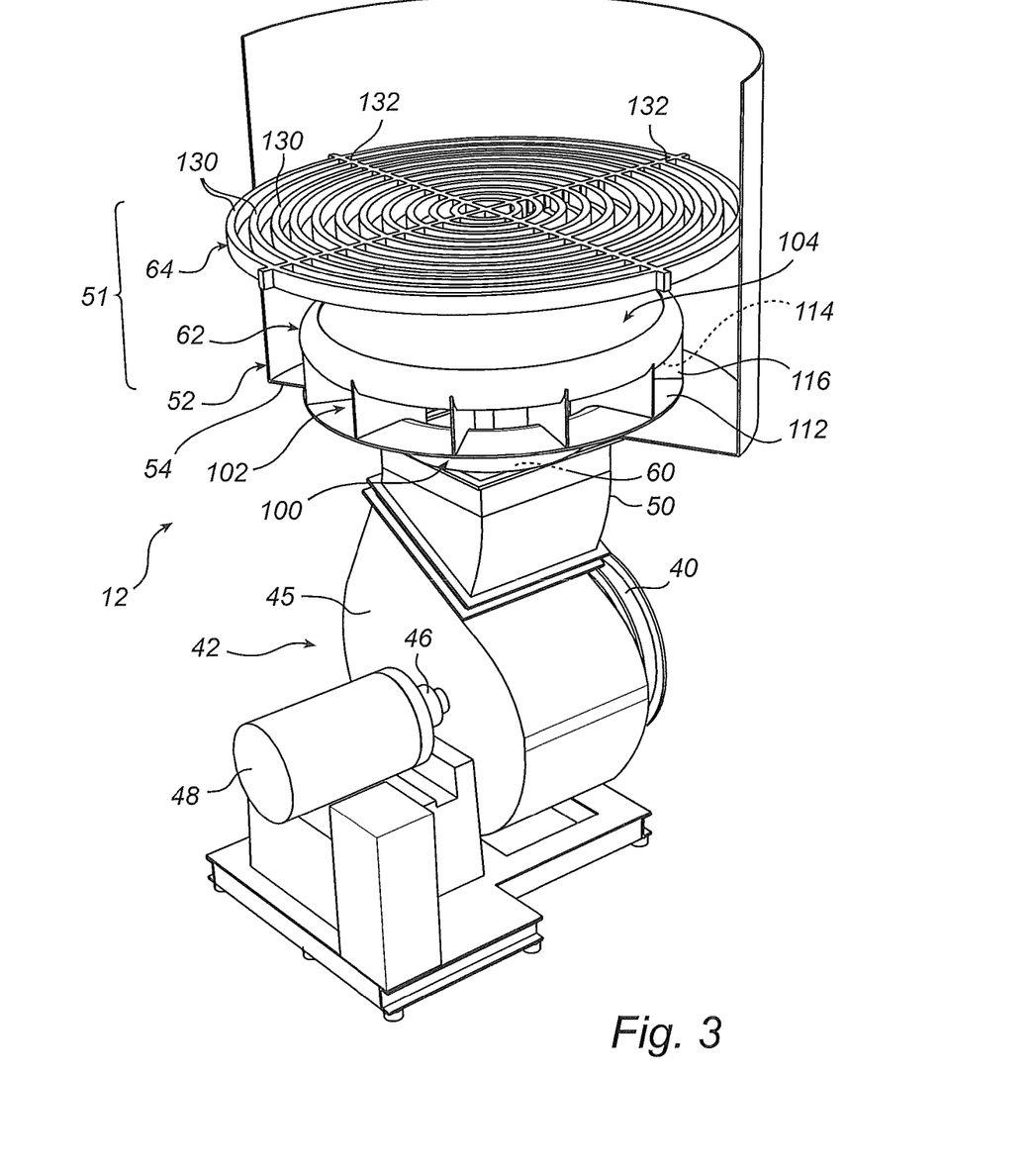
FIG. 3 is a perspective view of a lower portion of a wet scrubber of the gas cleaning unit of FIGS. 1-2.

FIGS. 3-7 illustrate a lower portion 51 of wet scrubber 12 in more detail. FIG. 3 illustrates fan 42 to which outlet duct 40 illustrated in FIG. 1 is fluidly connected. Motor 48 rotates via horizontal shaft 46 the impeller (not shown in FIG. 3) inside of housing 45 causing the effluent gas from the fabric filter illustrated in FIGS. 1 and 2 to move. The effluent gas moves through fan 42 substantially vertically upward via fan outlet 50. Fan outlet 50 performs the function of a scrubber inlet duct directing effluent gas into wet scrubber housing 52 via inlet opening 60. The effluent gas flows, inside fan outlet 50, in a direction, an inlet gas flow direction, which is close to vertically upward.

Effluent gas flows via inlet opening 60 arranged in wet scrubber 12 bottom 54 into gas distributor 62 arranged within the housing 52 of wet scrubber 12. As illustrated in FIG. 3 gas distributor 62 is, in this embodiment, arranged centrally in the bottom 54 of wet scrubber housing 52.

Gas distributor 62 comprises, as its main components, an inlet throat 100, a diffuser 102, and a liquid collector 104. Gas distributor 62 distributes effluent gas entering the wet scrubber 12 via inlet opening 60, in such a manner that the effluent gas inside wet scrubber 12 housing 52 is very evenly distributed there throughout. An even distribution of effluent gas results in efficient removal of pollutants from the effluent gas. Furthermore, gas distributor 62 is very energy efficient meaning that most of the dynamic energy of effluent gas from fan 42 is recovered as useful static energy downstream of the gas distributor 62. Hence, the amount of energy consumed by fan 42 to force the effluent gas through wet scrubber 12 is reduced compared to that of the prior art.

Each of the inlet throat 100, the diffuser 102, and the liquid collector 104 are described in more detail hereinafter with regard to their respective designs and functions, best illustrated in FIGS. 3-7.

Figure 4:
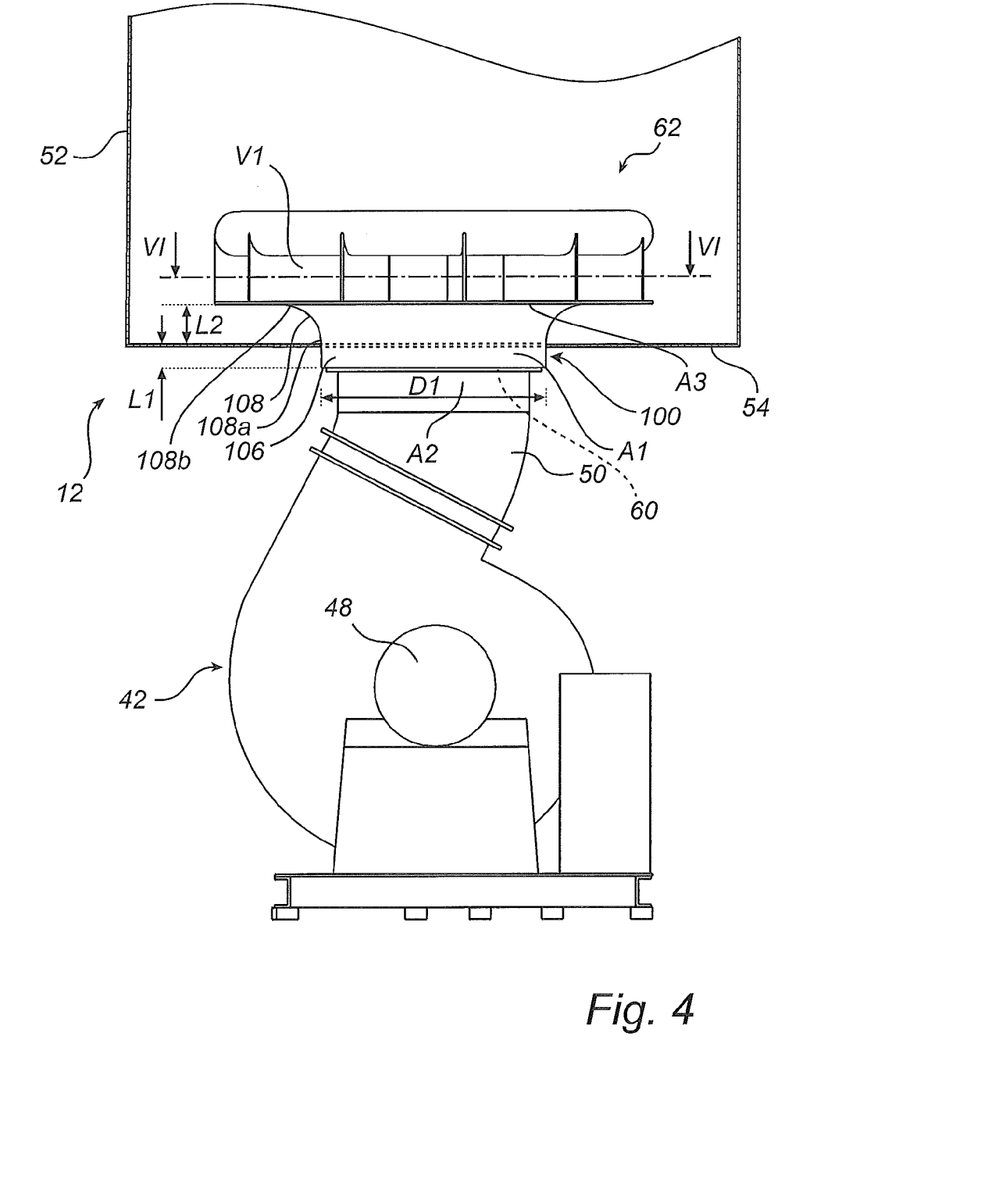
FIG. 4 is a side-view of the lower portion of the wet scrubber of FIG. 3.

FIG. 4 illustrates inlet throat 100 with a first portion 106 and a second portion 108. The first portion 106 is cylindrical having a constant circumference and hence constant horizontal cross-sectional area, A1, the same as the horizontal cross-sectional area of the inlet opening 60. Hence, the average gas velocity of effluent gas passing through first portion 106 is constant throughout its passage through first portion 106. First portion 106 is fluidly connected to fan outlet 50. Fan outlet 50 has a horizontal cross-sectional area, A2, at its point of fluid connection to first portion 106. Typically, cross-sectional area A2 is similar in size to cross-sectional area A1. The average effluent gas velocity at fan outlet 50 is typically 20-40 m/s. Hence, the average effluent gas velocity in first portion 106 may also be 20-40 m/s, or slightly higher if the area A1 is smaller than that of area A2. In one example, the average effluent gas velocity in fan outlet 50 is 30 m/s, and the average effluent gas velocity in first portion 106 is 32 m/s. Typically, first portion 106 has a vertical length, L1, about 5-20% of its diameter, D1.

The second portion 108 is fluidly connected to first portion 106. At point 108a where second portion 108 connects to first portion 106, second portion 108 is cylindrical and has approximately the same diameter, D1, as that of first portion 106. As illustrated in FIG. 4, the second portion 108 has an increasing horizontal cross-sectional area as one moves in a direction away from first portion 106. Top 108b of second portion 108 has a horizontal cross-sectional area, A3, typically 180-220% of area A1. Typically, second portion 108 has a vertical length, L2, about 10-30% of its smallest diameter D1.

Figure 5:
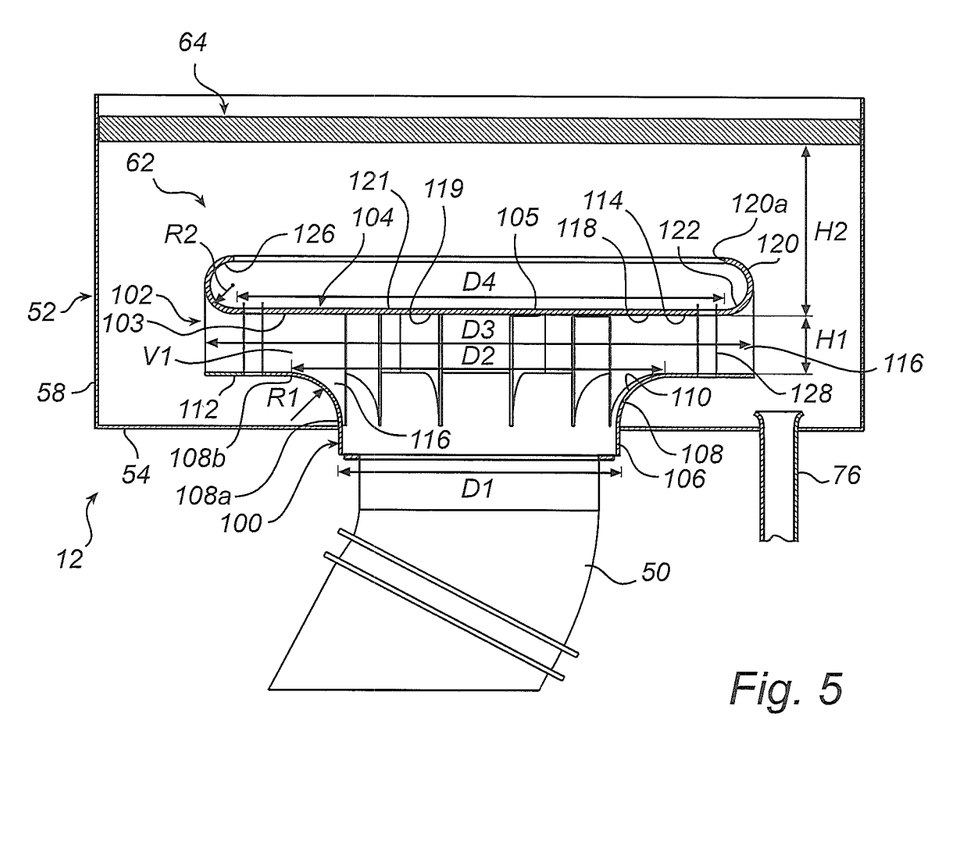
FIG. 5 is a cross-sectional view of a portion the lower portion of the wet scrubber depicted in FIG. 4.

FIG. 5 illustrates gas distributor 62 as viewed from the side in cross-section. Second portion 108 of inlet throat 100 has a smooth inner curvature 110. Inner curvature 110 has a radius, R1, typically 10-30% of diameter D1 of second portion 108 at point 108a. An advantage of the inner curvature 110 is that the flow of effluent gas may be redirected by about 70-110°, from an inlet flow direction to a differing diffuser flow direction in a very efficient manner with little loss of energy. As illustrated in FIG. 5, the flow of effluent gas may be redirected by about 90°, from the inlet flow direction being close to vertical, to the diffuser flow direction being close to horizontal. The second portion 108 ends with the end of the smooth curvature 110 at top 108b. At top 108b, second portion 108 has an outer diameter, D2, typically 120-160% of the diameter D1. It will be appreciated that the area A3 described hereinabove with reference to FIG. 4 is calculated based on the diameter D2. The inlet throat 100 may be circular in cross-section, as illustrated in, for example, FIG. 3, but may also be constructed in other desirable configurations or geometries.

Returning to FIG. 3, effluent gas flowing through inlet throat 100 enters diffuser 102. Diffuser 102 retards, under an increase in static pressure, the gas velocity of the effluent gas. Diffuser 102 comprises a horizontal lower plate 112, a cover plate in the form of a horizontal upper plate 114, and a number of vertical side walls 116 extending from lower plate 112 to upper plate 114. Horizontal upper plate 114 is arranged in the path of effluent gas flowing into wet scrubber housing 52 via inlet opening 60.

FIG. 5 illustrates horizontal lower plate 112 of diffuser 102 encircling second portion 108 of inlet throat 100 at top 108b. Hence, horizontal lower plate 112 has an inner diameter, D2, approximately equal to the outer diameter D2 of second portion 108. Horizontal lower plate 112 has an outer diameter, D3, preferably 130-160% of diameter D2, and 150-250% of diameter D1. Horizontal upper plate 114 is, in the embodiment illustrated in FIGS. 3-7, substantially perpendicular to the flow of effluent gas through wet scrubber housing 52. As alternative, horizontal upper plate 114 could have a slightly different angle. Horizontal upper plate 114 could have an angle of 70-110° to that of effluent gas flow through wet scrubber housing 52. For example, horizontal upper plate 114 could be somewhat cone-shaped and have an angle of 70-110° with respect to the flow of effluent gas through wet scrubber housing 52.

Continuing with the description of FIG. 5, horizontal upper plate 114 has a horizontal central portion 118 and an outer curved portion 120 encircling central portion 118. Horizontal upper plate 114 thus resembles a brim of a hat. Central portion 118 has a diameter, D4, typically 80-100% of the diameter D3. The outer curved portion 120 may, for example, have the vertical cross sectional shape of a half-circle, as illustrated in FIG. 5, a quarter circle, or some other suitable shape, starting at a rim 122 of the central portion 118 and moving outward to tip 120a. Typically, the outer radius, R2, of curved portion 120 is 3-10% of diameter D4 of central portion 118.

At top 108b where second portion 108 of inlet throat 100 joins diffuser 102, a vertical limit is denoted, V1. Vertical limit V1 encircles second portion 108 and has a diameter D2, the same as the outer diameter D2 of second portion 108. Vertical limit V1 is like a vertical cylinder with diameter D2 and height H1, H1 being the vertical distance between horizontal lower plate 112 and horizontal upper plate 114. Hence, the area of vertical limit V1 is equal to H1*D2*pi. Effluent gas flowing from inlet throat 100 to diffuser 102 flows through vertical limit V1. If the effluent gas has a rather even gas distribution profile throughout fan outlet 50, then area of V1 may be similar to area A1. On the other hand, if the effluent gas has an uneven gas distribution profile throughout fan outlet 50, which is a rather common situation since a fan 42 is rather prone to generating a skew gas distribution profile, then area of V1 is preferably smaller than area A1. With area of V1 smaller than area A1, effluent gas is throttled when passing from second portion 108 of inlet throat 100 and into diffuser 102. Such throttling contributes to "trimming" the gas distribution, meaning that the effluent gas flowing through diffuser 102 will have a rather even gas distribution, although fan 42 may cause a rather skew gas distribution of effluent gas. The throttling achieved by the area of V1 being smaller than area A1 occurs, partly due to the smooth inner curvature 110 and an acceleration of the gas during the redirection thereof, from vertical flow to horizontal flow, at a low loss of pressure. Hence, in case the gas distribution of effluent gas in fan outlet 50 is not very even, then area of V1 is preferably 70-99% of area A1, more preferably 75-98% of area A1, to achieve a throttling of the effluent gas in the transition between the inlet throat 100 and diffuser 102.

Side walls 116 extend horizontally from diameter D1, i.e., from the inner diameter of portion 106 of inlet throat 100, to diameter D3, i.e., to the outer diameter of horizontal lower plate 112. Height, H1, between horizontal lower plate 112 and horizontal upper plate 114 is typically 10-30% of the diameter D1. Side walls 116 have at their respective central portions a vertical height equal to height H1.

Figure 6:
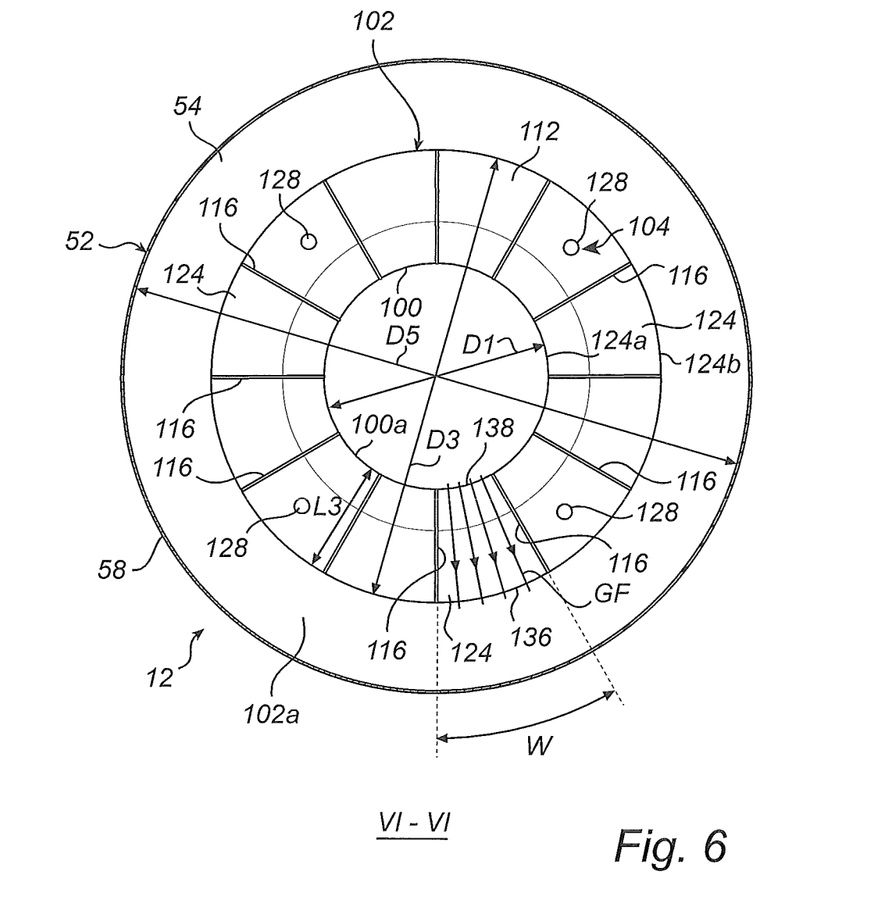
FIG. 6 is a cross-sectional view of a gas distributor, viewed in the direction depicted by arrows VI-VI of FIG. 4.

FIG. 6 illustrates diffuser 102 in cross-section, viewed in the direction depicted by arrows VI-VI of FIG. 4. As illustrated, diffuser 102 comprises twelve side walls 116. Side walls 116 are substantially evenly positioned over horizontal lower plate 112. Side walls 116 define diffuser channels 124. In total, twelve such diffuser channels 124 are arranged side by side in the subject embodiment. Diffuser channels 124 increase in dimension from interior 124a at inlet throat 100 to exterior 124b of the respective channel 124. Within diffuser channels 124, the gas flow velocity of the effluent gas is gradually retarded, from an initial gas velocity of 20-40 m/s at inlet throat 100 to typically 9-18 m/s upon exit of diffuser channels 124. Gas velocity is further reduced when the effluent gas flows into wet scrubber housing 52 of the wet scrubber 12.

Diffuser channels 124 channel effluent gas flow at an angle of 70-110° to that of effluent gas flow through wet scrubber housing 52 where effluent gas contact is made with the absorption liquid. In the embodiment illustrated in FIGS. 3-7, the flow of effluent gas through wet scrubber housing 52 when contacting absorption liquid is essentially vertical, and effluent gas flow through diffuser channels 124 is almost horizontal. Accordingly, gas flow through diffuser channels 124 is, in this embodiment as best illustrated in FIG. 5, about 90° with respect to effluent gas flow through wet scrubber housing 52 when in contact with the absorption liquid.

Continuing with the description of the embodiment illustrated in FIG. 6, wet scrubber housing 52 typically has an inner diameter, D5, 2.5-3.5 times diameter D1. Hence, the average gas velocity in wet scrubber housing 52, vertically above gas distributor 62 as depicted in perspective FIG. 3, is about 2.5-3.5 m/s.

Referring to FIG. 3, liquid collector 104 is arranged vertically above inlet throat 100 and diffuser 102. During operation of wet scrubber 12, liquid is supplied to nozzles 68, illustrated in FIG. 1, which flows vertically downward inside wet scrubber 12 housing 52, optionally via the gas-liquid contacting packing 66. Preferably, little or no portion of this liquid flows into diffuser 102 or further into inlet throat 100. Large amounts of liquid flowing into inlet throat 100, and further into fan 42 may result in fan malfunction. Furthermore, in the absence of a liquid collector 104 the gas distribution properties of diffuser 102 would be distorted by large amounts of liquid flowing by diffuser channels 124 in an uncontrolled manner, resulting in less efficient gas distribution.

FIG. 5 illustrates liquid collector 104 in more detail. Liquid collector 104 is provided with a trough 126 arranged above inlet throat 100. Trough 126 is comprised by horizontal upper plate 114 with its horizontal central portion 118 and outer curved portion 120. Hence, liquid collector 104 and diffuser 102 share horizontal upper plate 114 with its horizontal central portion 118 and outer curved portion 120. Underside portions 119 of central portion 118 and outer curved portion 120 form upper portion 103 of diffuser 102, and upper side portions 121 of central portion 118 and outer curved portion 120 form lower portion 105 of liquid collector 104. Hence, liquid flowing vertically downward inside wet scrubber 12 housing 52 is collected either in liquid collector 104, or by horizontal bottom 54 of the wet scrubber housing 52. Liquid flowing downward centrally in housing 52 is predominantly collected on liquid collector 104, whereas liquid flowing downward adjacent to side wall 58 of wet scrubber housing 52 is predominantly collected at bottom 54 of wet scrubber housing 52.

Liquid collected in liquid collector 104 needs to be drained therefrom without unduly interfering with the effluent gas flowing from diffuser 102. To this end, liquid collector 104 comprises at least one fluidly connected drain pipe 128. Drain pipe 128 drains liquid from trough 126 of liquid collector 104 through horizontal central portion 118 of horizontal upper plate 114 and further through horizontal lower plate 112 of diffuser 102. Hence, liquid collected in trough 126 of liquid collector 104 is drained to the bottom 54 of wet scrubber 12 housing 52 without interfering in an uncontrolled manner with effluent gas flowing through diffuser 102. All of the liquid collected at the bottom 54, i.e., the liquid drained from liquid collector 104 plus the liquid flowing downward adjacent to side wall 58 of wet scrubber 12 housing 52, is drained from bottom 54 of wet scrubber 12 via fluidly connected pipe 76. The fluidly connected pipe 76 may, for example, as described hereinbefore with reference to FIG. 1, drain the liquid to a circulation tank 78, or to a nearby ocean 73.

FIG. 6 illustrates liquid collector 104, equipped with four drain pipes 128. The four drain pipes 128 are preferably evenly distributed around the periphery 100*a* of inlet throat 100 and extend vertically through horizontal lower plate 112 and horizontal upper plate 114, as also depicted in FIG. 5, and hence extend through four of the respective diffuser channels 124. If equipped with more than four drain pipes 128, each drain pipe 128 requires a smaller diameter meaning that the disturbance to the effluent gas flow in diffuser channels 124 in which a drain pipe 128 is located, is reduced. If equipped with only one drain pipe 128, a large disturbance would result for the effluent gas flow flowing through that particular diffuser channel 124 with such a larger diameter sole drain pipe. Hence, it is preferable that liquid collector 104 is provided with at least two, and preferably at least three, drain pipes 128 distributed evenly around the periphery 100*a* of inlet throat 100.

FIG. 3 illustrates horizontal gas distribution grid 64 arranged vertically above gas distributor 62. Gas distribution grid 64, which is optional, may comprise a number of concentric rings 130 supported by radial bars 132. Horizontal gas distribution grid 64 performs a fine-tuning of the gas distribution already achieved through gas distributor 62. Typically, the gas side pressure drop over gas distribution grid 64 would be only 50-400 Pa during operation of wet scrubber 12, corresponding to relatively low energy consumption by fan 42 to move effluent gas through gas distribution grid 64.

FIG. 5 illustrates horizontal gas distribution grid 64 arranged at a distance, H2, above horizontal upper plate 114 of diffuser 102. Typically, distance H2 would be 2-6 times the height, H1, between horizontal lower plate 112 and horizontal upper plate 114. In the example illustrated in FIG. 5, height H2 is 3 times that of height H1.

Figure 7:
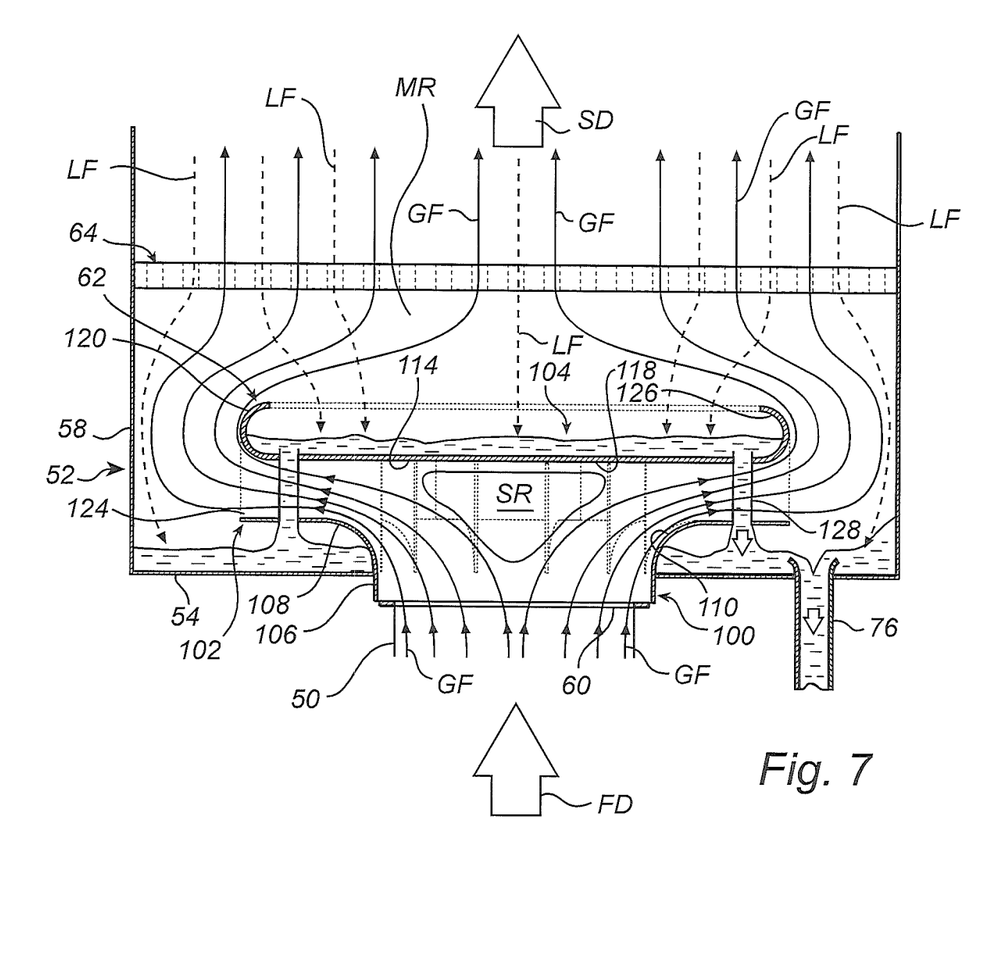
FIG. 7 is a view similar to that of FIG. 5 illustrating the flow of liquid and effluent gas in a portion of the lower portion of the wet scrubber.

FIG. 7 illustrates schematically flow patterns of effluent gas, as obtained from a computer simulation performed in a three-dimensional flow dynamics calculation program, and flow patterns of liquid adjacent to gas distributor 62. Effluent gas enters wet scrubber housing 52 in an inlet gas flow direction, illustrated by arrow FD, which is almost vertically upward. Effluent gas is, downstream of gas distribution grid 64, forwarded in a scrubber gas flow direction SD, which is almost vertically upward, to be brought into contact with the absorption liquid in wet scrubber housing 52. Liquid flow, LF, in the region of the gas distributor 62 is illustrated with dashed arrows and effluent gas flow, GF, is illustrated with unbroken arrows.

As illustrated in FIG. 7, liquid flow LF flowing vertically downward from nozzles 68 illustrated in FIG. 1, is either collected in trough 126 of liquid collector 104, or is collected at bottom 54 of wet scrubber housing 52. Liquid collected in trough 126 then drains via drain pipes 128 to bottom 54. Liquid collected on bottom 54 is drained via pipe 76 to circulation tank 78 or nearby ocean 73, as the case may be.

The flow of effluent gas GF enters gas distributor 62 vertically from below via fan outlet 50, inlet opening 60 and first portion 106 of inlet throat 100. Effluent gas flow GF from fan 42, illustrated in FIGS. 3 and 4, via fan outlet 50 often has a rather skewed gas flow profile, since fan 42 seldom provides a gas flow with an even gas flow profile. Upon entering second portion 108 of inlet throat 100, effluent gas is redirected by about 90° toward diffuser 102. Upon redirection, effluent gas follows the smooth inner curvature 110 of second portion 108. Upper plate 114 of diffuser 102 is substantially perpendicular to the scrubber gas flow direction SD in which the effluent gas flows through wet scrubber housing 52, and is arranged in the path of the effluent gas flowing into wet scrubber housing 52 via inlet opening 60. Just below the centre of horizontal central portion 118 of horizontal upper plate 114, a stagnant effluent gas region, SR, is formed. The stagnant effluent gas region SR is shaped similar to that of a cone with its tip (vertex) pointing downward, which contributes to forcing effluent gas toward diffuser 102. Due to the smooth inner curvature 110 of second portion 108 and stagnant effluent gas region SR, effluent gas flow GF is relatively evenly distributed among the twelve diffuser channels 124 of diffuser 102. Furthermore for example, with an area of V1 smaller than that of area A1 as described hereinbefore with reference to FIG. 5, an area of V1 75-98% of that of area A1, a throttling of effluent gas is effected in the transition between inlet throat 100 and diffuser 102. Such throttling further contributes to trimming an initially uneven gas distribution.

Continuing with the description of FIG. 6, effluent gas flow GF through diffuser channels 124 encounter, as illustrated for one of the diffuser channels 124 in FIG. 6, a gradually wider expanse upon movement from interior 124*a* at inlet throat 100 to exterior 124*b* of diffuser channel 124. Effluent gas flow GF to at least some extent follows side walls 116 of diffuser channel 124. Hence, side walls 116 contribute to the effluent gas flow GF spreading evenly throughout diffuser channel 124 as the same gradually widens. Effluent gas flow GF from diffuser channel 124 has a relatively even gas flow profile. It is preferable that diffuser 102 is provided with a suitable number of side walls 116 to achieve such an optimum gas distribution. With too few side walls 116, effluent gas flow GF would not follow side walls 116 as efficiently, resulting in a less even gas flow profile at the outlet 102*a* of diffuser 102. Preferably, angle, W, between two adjacent side walls 116 is 20-45°. In one example, angle W is 30°. In the embodiment illustrated in FIG. 6, the cross-section of diffuser channel 124 is slightly more than twice as large at outlet end 136 as compared to inlet end 138. Partly, such dimensions are an effect of outer curved portion 120 curving away from horizontal lower plate 112, as illustrated in FIG. 5. Hence, effluent gas flow GF undergoes, while passing through diffuser channel 124, a gas velocity reduction of a factor of about 2.2. Typically, the gas velocity of the effluent gas flow is reduced from 20-40 m/s at inlet end 138 to 9-18 m/s at outlet end 136. Length L3 of diffuser channel 124 is equal to half of the difference between outer diameter D3 of horizontal lower plate 112 and inner diameter D1 of inlet throat 100, i.e., L3=(D3−D1)/2.

Returning to FIG. 7, effluent gas flow GF from diffuser channel 124 partly follows the smooth radius of the curved portion 120 encircling central portion 118 prior to redirection by side wall 58 of wet scrubber 12 housing 52. Effluent gas flow GF is thereby redistributed to achieve the desired rather even gas flow distribution throughout housing 52. Gas distribution grid 64 further promotes an even gas flow distribution. As depicted in FIG. 7, liquid flow LF flowing adjacent to side wall 58 is diverted into the wall 58 by the effluent gas flow GF, and flows downward along wall 58. Furthermore, liquid flow LF flowing downward above trough 126, or at least adjacent to trough 126, is diverted by the effluent gas flow GF, into trough 126.

Just below gas distribution grid 64, a region MR of intense mixing of effluent gas and absorption liquid is formed. Such a region MR of intense mixing contributes significantly to efficient removal of pollutants from the effluent gas. Furthermore, this mixing region MR contributes to efficient cooling and saturation of the effluent gas with water vapour.

Hence, the effluent gas flowing vertically upward into the gas-liquid contacting packing 66 and into contact with the liquid supplied from nozzles 68, has a surprisingly even gas flow distribution meaning that removal of sulphur dioxide inside the wet scrubber 12 is quite efficient.

Figure 8:
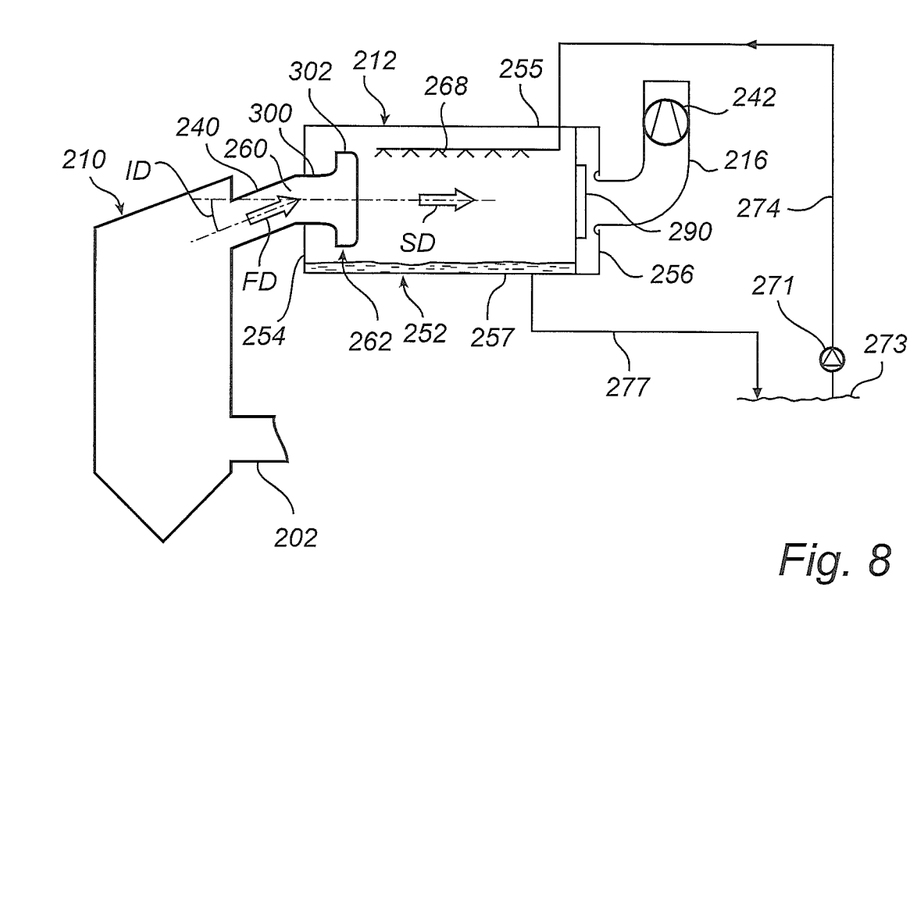
FIG. 8 is a schematic side view, in cross-section, of a wet scrubber in accordance with an alternative embodiment.

FIG. 8 illustrates an alternative embodiment in the form of a wet scrubber 212. A dust removal device, which may, for example, be a fabric filter 210 is provided with an inlet 202 through which an effluent gas is supplied to the fabric filter 210. The effluent gas may, for example, have its origin in a metallurgical process, a coal or oil fired boiler, or a waste incineration plant. The fabric filter 210 removes most of the dust particles of the effluent gas in accordance with similar principles as described hereinbefore with regard to fabric filter 10. The effluent gas flows from fabric filter 210 via an outlet duct 240 which performs the function of a scrubber inlet duct directing effluent gas into wet scrubber housing 252 via an inlet opening 260. The outlet duct 240 is arranged at an angle of about 40° from a horizontal plane. Wet scrubber 212 housing 252 is arranged for horizontal effluent gas flow therethrough with the effluent gas flowing horizontally from a first end 254 to a second end 256 of housing 252. The inlet opening 260 is arranged in first end 254. Outlet duct 240 is fluidly connected to inlet opening 260. Thus, effluent gas flows into the housing 252 in an inlet gas flow direction FD from outlet duct 240 at an angle, ID, of 40° with respect to the horizontal scrubber gas flow direction SD in which the effluent gas flows through wet scrubber housing 252.

A set of nozzles 268 is arranged in an upper portion 255 of housing 252. A pump 271 supplies absorption liquid, which may be seawater forwarded from an ocean 273, to nozzles 268 via a fluidly connected pipe 274. Effluent gas passes horizontally beneath nozzles 268, as indicated by arrow SD, and is brought into contact with the absorption liquid. Spent absorption liquid is collected at a bottom portion 257 of housing 252 and is returned to the ocean 273 via a fluidly connected pipe 277.

Inlet opening 260 is fluidly connected to a gas distributor 262. Gas distributor 262 may comprise an inlet throat 300 and a diffuser 302 that are similar if not identical to inlet throat 100 and diffuser 102 described hereinbefore with reference to FIGS. 3-7. Since effluent gas flows horizontally through wet scrubber housing 252, a liquid collector may be omitted in gas distributor 262.

Cleaned effluent gas leaves wet scrubber 212, after having passed a droplet eliminator 290 arranged at second end 256. Effluent gas then flows to a stack 216 and is finally discharged into the atmosphere. In the embodiment illustrated in FIG. 8, a fan 242 for forcing effluent gas through fabric filter 210 and wet scrubber 212 is arranged in stack 216.

It will be appreciated that numerous variants of the embodiments described above are possible within the scope of the appended claims.

Hereinbefore it has been described that wet scrubber 12 may be utilized for cleaning an effluent gas generated in aluminium production electrolytic cells 20. It will be appreciated that wet scrubber 12 may be utilized also in other applications. For example, wet scrubber 12 may be utilized for cleaning effluent gases generated in other metallurgical processes, such as blast furnaces, and in other industrial processes, including, but not limited to, waste incineration plants, coal and oil fired power plants, etc.

Hereinbefore, it has been described, with reference to FIGS. 1-7, that inlet opening 60 is arranged to allow effluent gas to flow into wet scrubber housing 52 in a gas flow direction close to vertical. Such is almost the same as the vertical direction of effluent gas flow through wet scrubber housing 52 when in contact with absorption liquid. The gas flow direction of the effluent gas entering the wet scrubber housing 52 via the inlet opening 60 may deviate somewhat from the gas flow direction inside the housing 52. Hence, with a vertical scrubber gas flow direction SD inside wet scrubber housing 52, meaning an angle of 0° to the vertical plane, the inlet gas flow direction FD of the effluent gas in the inlet opening 60 may be within an angle of +/−45° to the vertical gas flow direction inside the wet scrubber housing 52, i.e., within an angle of +/−45° to the vertical plane. In the embodiment illustrated in FIGS. 1-7, the inlet gas flow direction FD of the effluent gas in the inlet opening 60 is at an angle of 0° to the vertical scrubber gas flow direction SD inside the wet scrubber housing 52 and is, hence, also at an angle of 0° to the vertical plane. In the embodiment illustrated in FIG. 8, the inlet gas flow direction FD of the effluent gas in the inlet opening 260 is at an angle ID of 40° to the horizontal scrubber gas flow direction SD inside the wet scrubber housing 252.

Hereinbefore, a wet scrubber 12 has been described in which effluent gas flows vertically upward inside the wet scrubber 12 housing 52. It will be appreciated that other arrangements are possible. In accordance with a first alternative embodiment, a wet scrubber 212 could be arranged for a horizontal flow of effluent gas inside the wet scrubber housing, as illustrated in FIG. 8. According to a yet further alternative embodiment, the wet scrubber housing could be arranged for effluent gas flowing vertically downward through the wet scrubber housing. In such a case, the inlet opening and gas distributor would be arranged in the top of the wet scrubber housing to distribute effluent gas entering the wet scrubber housing from above.

Hereinbefore, it has been described that the effluent gas enters the wet scrubber 12 housing 52 via an inlet opening 60 in the bottom 54 of the wet scrubber 12. It will be appreciated that an inlet opening may also be arranged in other positions at the wet scrubber 12 housing 52. For example, an inlet opening may be arranged in a lower portion of the wet scrubber 12 cylindrical side wall 58. Still further, an inlet opening may be arranged in that position on the wet scrubber 12 housing 52 where bottom 54 is joined to side wall 58.

Hereinbefore, it has been described that the wet scrubber 12 is provided with a packing 66. It will be appreciated that the wet scrubber 12 may also be designed without any packing, in which case the mixing of absorption liquid and effluent gas relies on the atomization of absorption liquid by nozzles 68. An example of a useful nozzle 68 is the WhirlJet™ nozzle available from Spraying Systems Co, Wheaton, Ill., USA. It will be appreciated that nozzles 68 could be arranged in several different vertical levels inside the wet scrubber 12 housing 52. Furthermore, the nozzles 68 could be arranged to spray the liquid counter-current, as illustrated in FIG. 1, co-current, or both counter-current and co-current, in relation to the flow of effluent gas.

Hereinbefore it has been described that the gas cleaning unit 1 comprises a first and a second contact reactor 4, 6 in which the effluent gas is brought into contact with alumina. It will be appreciated that a gas cleaning unit could also, in accordance with an alternative embodiment, be provided with a single contact reactor, in which the effluent gas is brought into contact with recirculated and fresh alumina. In accordance with a further alternative embodiment, a gas cleaning unit could be provided with three or more contact reactors arranged in series.

Hereinbefore it has been described that the fan 42 is a radial fan. It will be appreciated that other types of fans, for example axial fans, could also be utilized for forwarding the effluent gas through the gas cleaning unit 1.

Hereinbefore it has been described that the pump 70, tank 78 and pH adjustment equipment 82, 84, 86, 88 are all arranged on the ground 72. It will be appreciated that it would also be possible to arrange some or all of these devices in another location. In accordance with one embodiment, at least one of the pump 70, the tank 78, the associated pipes 76, 74, and the pH adjustment equipment 82, 84, 86, 88 is arranged inside the gas cleaning unit 1 penthouse 14. In accordance with a further embodiment, the pump 70, the tank 78, the associated pipes 76, 74, and the pH adjustment equipment 82, 84, 86, 88 are all arranged inside the penthouse 14.

Hereinbefore it has been described that the alumina silo 8 is integrated in the gas cleaning unit 1. It will be appreciated that it is also possible to design a gas cleaning unit having no alumina silo 8 integrated therein. In such a case, fresh alumina may be supplied from a remote central alumina storage, fluidly connected to supply pipe 24.

Hereinbefore, the gas cleaning unit 1 has been described as comprising one fabric filter 10, and one wet scrubber 12. It will be appreciated that a gas cleaning unit could be provided with several parallel fabric filters, for example 2 to 100 parallel fabric filters, and a number of parallel wet scrubbers, for example 2 to 100 parallel wet scrubbers. The number of wet scrubbers need not correspond to the number of fabric filters. Hence, for example, two parallel fabric filters could be fluidly connected to one common wet scrubber.

To summarize, a wet scrubber 12 for removal of at least one gaseous pollutant from an effluent gas comprises an inlet opening 60. A gas distributor 62 is arranged in a wet scrubber housing 52 and comprises a diffuser 102 having a cover plate 114. The cover plate 114 is arranged in the path of the effluent gas flowing into the wet scrubber housing 52. The diffuser 102 has at least one diffuser channel 124 for transporting the effluent gas from the inlet opening 60 into the wet scrubber housing 52.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A wet scrubber for removal of at least one gaseous pollutant from an effluent gas; said wet scrubber comprising:
   an inlet opening, a wet scrubber housing, which is fluidly connected to the inlet opening and through which wet scrubber housing the effluent gas is to flow in a scrubber gas flow direction;
   an absorption liquid supply device to supply an absorption liquid into said wet scrubber housing for contact of effluent gas with the absorption liquid inside of the wet scrubber housing; and
   a gas distributor arranged in the wet scrubber housing, the gas distributor comprising a diffuser having a cover plate arranged in the path of the effluent gas flowing into the wet scrubber housing via the inlet opening, and the diffuser further having at least one diffuser channel for transporting the effluent gas from the inlet opening into the wet scrubber housing; and
   wherein a scrubber inlet duct is arranged for directing effluent gas into the wet scrubber housing via the inlet opening in an inlet gas flow direction which is within +/−45° of the scrubber gas flow direction.

2. A wet scrubber for removal of at least one gaseous pollutant from an effluent gas; said wet scrubber comprising:
   an inlet opening, a wet scrubber housing, which is fluidly connected to the inlet opening and through which wet scrubber housing the effluent gas is to flow in a scrubber gas flow direction;
   an absorption liquid supply device to supply an absorption liquid into said wet scrubber housing for contact of effluent gas with the absorption liquid inside of the wet scrubber housing; and
   a gas distributor arranged in the wet scrubber housing, the gas distributor comprising a diffuser having a cover plate arranged in the path of the effluent gas flowing into the wet scrubber housing via the inlet opening, and the diffuser further having at least one diffuser channel for transporting the effluent gas from the inlet opening into the wet scrubber housing; and
   wherein the inlet opening is connected to a fan forcing a flow of effluent gas through the wet scrubber.

3. A wet scrubber according to claim 2, wherein the at least one diffuser channel has a gas flow direction of 70-110° with respect to the scrubber gas flow direction.

4. A wet scrubber according to claim 2, wherein the diffuser is provided with at least three diffuser channels separated by side walls.

5. A wet scrubber according to claim 2, wherein the absorption liquid supply device is arranged in an upper portion of the wet scrubber housing, and the inlet opening is arranged in a lower portion of the wet scrubber housing, with the effluent gas flowing vertically upward.

6. A wet scrubber according to claim 2, wherein the gas distributor comprises an inlet throat connected to the inlet opening, the inlet throat comprising an inner curvature along which the effluent gas flows moving from the inlet opening to the diffuser.

7. A wet scrubber according to claim 2, wherein a gas distribution grid is arranged in the wet scrubber housing downstream of the gas distributor.

8. A wet scrubber according to claim 2, wherein the gas distributor is arranged centrally in a bottom of the wet scrubber housing.

9. A wet scrubber according to claim 2, wherein a cross-sectional area at the inlet of the diffuser is smaller than a cross-sectional area at the inlet opening, such that a throttling of the effluent gas is effected when the effluent gas flows from the inlet opening into the diffuser.

10. A wet scrubber for removal of at least one gaseous pollutant from an effluent gas; said wet scrubber comprising:
    an inlet opening, a wet scrubber housing, which is fluidly connected to the inlet opening and through which wet scrubber housing the effluent gas is to flow in a scrubber gas flow direction;
    an absorption liquid supply device to supply an absorption liquid into said wet scrubber housing for contact of effluent gas with the absorption liquid inside of the wet scrubber housing; and
    a gas distributor arranged in the wet scrubber housing, the gas distributor comprising a diffuser having a cover plate arranged in the path of the effluent gas flowing into the wet scrubber housing via the inlet opening, and the diffuser further having at least one diffuser channel for transporting the effluent gas from the inlet opening into the wet scrubber housing, wherein the gas distributor comprises a liquid collector having a trough arranged over the diffuser to collect absorption liquid coming from the absorption liquid supply device.

11. A wet scrubber according to claim 10, wherein the liquid collector comprises at least one drain pipe arranged to drain absorption liquid collected in the trough past the diffuser.

12. A method of removing at least one gaseous pollutant from an effluent gas by bringing the effluent gas into contact with an absorption liquid inside a wet scrubber housing, the method comprising:
    admitting the effluent gas into the wet scrubber housing via an inlet opening;
    passing the effluent gas to a diffuser having a cover plate arranged in the path of the effluent gas flowing into the wet scrubber housing via the inlet opening;
    forwarding the effluent gas through at least one diffuser channel and into the wet scrubber housing, and
    forwarding the effluent gas in a scrubber gas flow direction in which the effluent gas flows through the wet scrubber housing when being brought into contact with the absorption liquid; and
    wherein an inlet gas flow direction of the effluent gas in the inlet opening is being within +/−45° of the scrubber gas flow direction.

13. A method according to claim 12, further comprising forwarding the effluent gas along an inner curvature of an inlet throat connected to the inlet opening as the effluent gas flows from the inlet opening to the diffuser.

14. A method of removing at least one gaseous pollutant from an effluent gas by bringing the effluent gas into contact with an absorption liquid inside a wet scrubber housing, the method comprising:
    admitting the effluent gas into the wet scrubber housing via an inlet opening;
    passing the effluent gas to a diffuser having a cover plate arranged in the path of the effluent gas flowing into the wet scrubber housing via the inlet opening;
    forwarding the effluent gas through at least one diffuser channel and into the wet scrubber housing,
    forwarding the effluent gas in a scrubber gas flow direction in which the effluent gas flows through the wet scrubber housing when being brought into contact with the absorption liquid; and
    collecting absorption liquid in a liquid collector having a trough arranged over the diffuser.

15. A method according to claim 14, further comprising forwarding the effluent gas in the scrubber gas flow direction being directed substantially vertically upward through the wet scrubber housing, and forwarding the effluent gas through the at least one diffuser channel at an angle of about 70-110° to the scrubber gas flow direction.

16. A method according to claim 14, further comprising draining absorption liquid collected in the trough past the diffuser separate from the flow of effluent gas.

17. A method of removing at least one gaseous pollutant from an effluent gas by bringing the effluent gas into contact with an absorption liquid inside a wet scrubber housing, the method comprising:
    admitting the effluent gas into the wet scrubber housing via an inlet opening;
    passing the effluent gas to a diffuser having a cover plate arranged in the path of the effluent gas flowing into the wet scrubber housing via the inlet opening;
    forwarding the effluent gas through at least one diffuser channel and into the wet scrubber housing,
    forwarding the effluent gas in a scrubber gas flow direction in which the effluent gas flows through the wet scrubber housing when being brought into contact with the absorption liquid; and
    reducing the gas velocity of the effluent gas by a factor of 1.5-3.0 while passing the effluent gas through the diffuser.

18. A method of removing at least one gaseous pollutant from an effluent gas by bringing the effluent gas into contact with an absorption liquid inside a wet scrubber housing, the method comprising:
    admitting the effluent gas into the wet scrubber housing via an inlet opening;
    passing the effluent gas to a diffuser having a cover plate arranged in the path of the effluent gas flowing into the wet scrubber housing via the inlet opening;
    forwarding the effluent gas through at least one diffuser channel and into the wet scrubber housing,
    forwarding the effluent gas in a scrubber gas flow direction in which the effluent gas flows through the wet scrubber housing when being brought into contact with the absorption liquid; and
    wherein the flow of effluent gas is throttled while being passed from the inlet opening and into the diffuser.

* * * * *